(12) United States Patent
Keller

(10) Patent No.: US 10,603,989 B2
(45) Date of Patent: Mar. 31, 2020

(54) MULTI FUNCTION BRACKET

(71) Applicant: Brose Schliesssysteme GmbH & Co. KG, Wuppertal (DE)

(72) Inventor: Peter Oliver Keller, Clarkston, MI (US)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 789 days.

(21) Appl. No.: 15/014,720

(22) Filed: Feb. 3, 2016

(65) Prior Publication Data

US 2016/0290006 A1 Oct. 6, 2016

Related U.S. Application Data

(60) Provisional application No. 62/141,648, filed on Apr. 1, 2015.

(51) Int. Cl.
*B60J 5/04* (2006.01)
*E05B 79/04* (2014.01)
*E05F 11/38* (2006.01)

(52) U.S. Cl.
CPC ............. *B60J 5/0416* (2013.01); *E05B 79/04* (2013.01); *E05F 11/382* (2013.01); *E05Y 2201/22* (2013.01); *E05Y 2201/684* (2013.01); *E05Y 2800/12* (2013.01); *E05Y 2900/55* (2013.01)

(58) Field of Classification Search
CPC ........ E05B 79/02; E05B 79/04; B60J 5/0416; E05F 11/382
See application file for complete search history.

(56) References Cited

U.S. PATENT DOCUMENTS

| 7,793,464 | B2 | 9/2010 | Bücker et al. | |
| 2007/0126259 | A1* | 6/2007 | Almeida | B60J 5/0416 296/146.1 |
| 2011/0023367 | A1* | 2/2011 | Barr | B60J 5/0416 49/349 |
| 2017/0096053 | A1* | 4/2017 | Faust | B60J 5/0402 |
| 2018/0015812 | A1* | 1/2018 | Kiwus | B60J 1/17 |

FOREIGN PATENT DOCUMENTS

| CA | 2 566 275 | * | 1/2006 |
| DE | 10 2009 040 014 | * | 3/2011 |
| DE | 10 2012 214 836 | * | 2/2014 |
| DE | 20 2012 104 145 | * | 3/2014 |

* cited by examiner

*Primary Examiner* — Gregory J Strimbu
(74) *Attorney, Agent, or Firm* — Pauly, DeVries Smith & Deffner LLC

(57) ABSTRACT

A multi function bracket for use in a motor vehicle door with a carrier, and an elastic seal arranged in a window guide for being compressed by a window pane, the carrier comprising a lock receptacle for fastening a motor vehicle lock, and the multi function bracket further comprising a motor vehicle lock fastened to the lock receptacle. The multi function bracket is characterized in that, a compensation section of the elastic seal is compressed between a counter structure of the multi function bracket and the motor vehicle lock to provide tolerance compensation between the carrier and the motor vehicle lock.

20 Claims, 5 Drawing Sheets

MULTI FUNCTION BRACKET

CLAIM OF PRIORITY

This application claims the benefit of U.S. Provisional Application No. 62/141,648, filed Apr. 1, 2015, the content of which is herein incorporated by reference in its entirety.

FIELD OF THE TECHNOLOGY

The application is directed to a multi function bracket for use in a motor vehicle door.

BACKGROUND

Such multi function brackets are fastened to the motor vehicle door of a motor vehicle and comprise a carrier for receiving functional elements such as in particular a motor vehicle lock. Regularly the carrier of the multi function bracket also comprises a window guide for receiving the window pane. Alternatively, the window guide may also be a separate structure of the multi function bracket to be connected to the carrier. Because so many components are fastened to the multi function bracket and for ease of assembly, it is desired to permit loose tolerances of the multi function brackets and the functional elements fastened to it. On the other hand, such loose tolerances are liable to result in backlash between the components. In particular when the motor vehicle with the multi function bracket is moving and experiences changes of load, the result is relative movement of the components causing annoying noises and being perceived as symptom of low quality. This is particularly relevant for fastening the motor vehicle lock to the carrier of the multi function bracket. Therefore, it is known from the prior art to provide for tolerance compensation with respect to the multi function bracket. Thereby, loose tolerances can still be used in production and for assembly but noise-causing movement due to backlash is prevented.

Prior art document U.S. Pat. No. 7,793,464 discloses a multi function bracket for use in a motor vehicle door with a carrier which can receive both a motor vehicle lock and a window guide for receiving a window pane. This multi function bracket also provides for tolerance compensation between the motor vehicle lock and the carrier. However, providing such a tolerance compensation is costly because separate components like washers must be produced and properly assembled with the multi function bracket.

SUMMARY

It is the object of the invention to improve the known multi function bracket such that tolerance compensation can be provided in a more cost-effective manner.

The above noted object is solved for a multi function bracket as described herein.

Underlying the invention is the realization that the elastic seal arranged in the window guide is a structure which is already provided for in the multi function bracket and which has suitable elastic properties for being used for tolerance compensation. Thus, there is no need to provide for additional or separate components to achieve tolerance compensation—the component already there can be used in a double function. Compressing the elastic seal in this way between the motor vehicle lock and the carrier has in fact the further advantage that it also fixes the elastic seal in place, thereby also obviating the need for a separate fixing structure.

Various embodiments concern a variant of the multi function bracket according to the proposal in which tolerance compensation is provided by the elastic seal at a first connection between the motor vehicle lock and the carrier and at least a further connection between the motor vehicle lock and the carrier provides the force to press the motor vehicle lock against the elastic seal. Such an arrangement is also easy for assembly.

In various embodiments, a snap-in connector is particularly advantageous to provide such a further connection.

An embodiment relates to a variant of the elastic seal with basically two sections in a single structure, with one section specifically for sealing the window pane and the other for tolerance compensation by compression. This permits cost effective production of the elastic seal as well as easy sliding-in of the elastic seal into the window guide.

According to an embodiment, the window guide itself can also have an elastically bending structure for contributing to the tolerance compensation.

Various embodiments relate to a design of the window guide which permits both easy insertion of the elastic seal and which also permits a contribution of the window pane itself to the tolerance compensation.

In an embodiment, provided is a multi function bracket for use in a motor vehicle door with a carrier, a window guide for receiving a window pane, an elastic seal arranged in the window guide for being compressed by the window pane, the carrier comprising a lock receptacle for fastening a motor vehicle lock, and the multi function bracket further comprising a motor vehicle lock fastened to the lock receptacle, wherein a compensation section of the elastic seal is compressed between a counter structure of the multi function bracket and the motor vehicle lock to provide tolerance compensation between the carrier and the motor vehicle lock.

In an embodiment, the lock receptacle comprises a first connecting structure and a second connecting structure for connecting to a first connector and second connector of the motor vehicle lock and in that the compensation section is compressed between the counter structure and the first connector.

In an embodiment, the first connecting structure and/or the second connecting structure is a respective receiving structure and in that the first connector and/or second connector is a respective latch, wherein the first receiving structure receives the first latch and/or the second receiving structure receives the second latch.

In an embodiment, the first latch comprises an engagement end, such as a stepped engagement end, for engaging behind an opening of the first receiving structure and a clamping section substantially adjacent to the engagement end, wherein the elastic seal is compressed between the counter structure and the clamping section. In some embodiments, the engagement end and the clamping section are substantially planar and aligned substantially in parallel.

In an embodiment, engaging behind the opening of the first receiving structure by the engagement end permits a swiveling of the motor vehicle lock for bringing the second latch into a connecting position for being connected to the second receiving structure.

In an embodiment, when the first connecting structure connects to the first connector, the counter structure and the first connector, in particular the clamping section, are arranged at a distance which is less than an uncompressed thickness of the elastic seal for compressing the elastic seal between the counter structure and the first connector.

In an embodiment, the second connecting structure engages the second connector such that the first connector, such as the engagement end, is pressed against the first connecting structure by the engagement of the second connecting structure and the second connector.

In an embodiment, the first connecting structure and the second connecting structure are respectively offset in the direction of a longitudinal extent of the window guide.

In an embodiment, the second connecting structure comprises a snap-in component for snapping-in the second connector of the motor vehicle lock.

In an embodiment, the elastic seal consists of an oblong-shaped pane-receiving section and the compensation section, which compensation section is widened with respect to the pane-receiving section.

In an embodiment, a boss is arranged on the counter structure and/or the clamping section for compressing the elastic seal. In an embodiment, the boss defines the distance between the clamping section and the counter structure.

In an embodiment, the counter structure is at least partially configured to bend elastically, in particular in a direction corresponding to a compression direction of the elastic seal, so as to contribute to the tolerance compensation between the carrier and the motor vehicle lock.

In an embodiment, the window guide comprises a closed channel section with a bottom wall, which bottom wall substantially faces the motor vehicle lock, on which the elastic seal rests on a side of the bottom wall opposite to the motor vehicle lock, and comprises an open channel section with a bottom opening facing the motor vehicle lock, which open channel section is an extension of the closed channel section.

In an embodiment, the counter structure comprises a ledge plate arranged in the open channel section on which ledge plate the elastic seal rests on a side of the ledge plate toward the motor vehicle lock.

In an embodiment, the ledge plate is arranged such that the ledge plate protrudes into the open channel section, whereby the ledge plate borders the bottom opening with at least one side. In an embodiment, the ledge plate borders the bottom opening with three sides of the ledge plate.

In an embodiment, the elastic seal is arranged in the window guide and passes through the bottom opening such that the elastic seal is placed on a far side of the bottom wall with respect to the motor vehicle lock and on a near side of the ledge plate with respect to the motor vehicle lock.

BRIEF DESCRIPTION OF THE FIGURES

In the following the invention will be described in an example referring to the drawings. In the drawings it is shown in FIG. 1 a perspective view of the proposed multi function bracket, FIG. 2 a view of the part of the multi function bracket according to FIG. 1 providing tolerance compensation in a longitudinal section showing a boss on the counter structure, FIG. 3 a perspective explosion view of the multi function bracket of FIG. 1, FIG. 4 a detailed perspective view corresponding to the part of the multi function bracket of FIG. 2, and FIG. 5 a perspective explosion view of the multi function bracket with the boss disposed on the clamping section.

DETAILED DESCRIPTION

Figure 1:
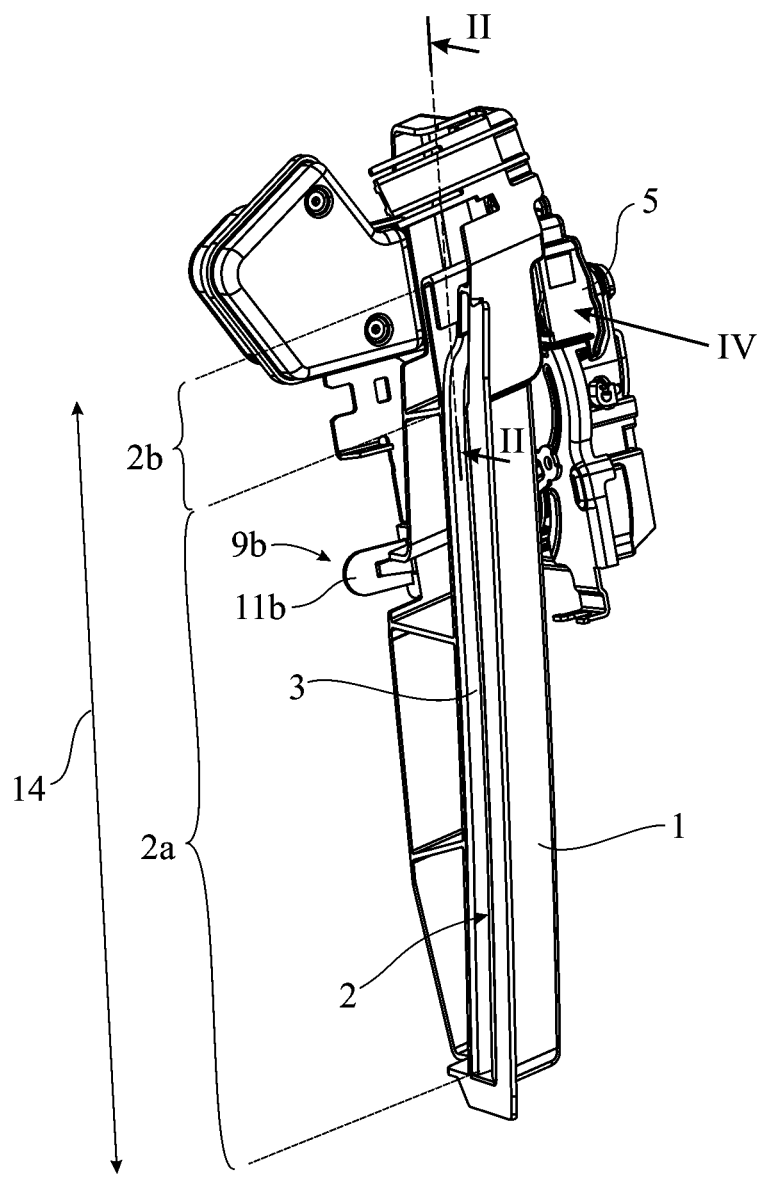

The multi function bracket shown in the drawings is assigned to a motor vehicle door of a motor vehicle, both of which are not shown here. Accordingly, the multi function bracket is for use in such a motor vehicle door.

The multi function bracket according to the proposal comprises a carrier 1 and a window guide 2 for receiving a window pane. That window pane is also not shown here. According to the proposal, the multi function bracket further comprises an elastic seal 3 arranged in the window guide 2 for being compressed by the window pane. The carrier 1 comprises a lock receptacle 4 for fastening a motor vehicle lock 5. Such a lock receptacle 4 may in principle be any structure which permits fastening the motor vehicle lock 5. It is also to be pointed out that the window guide 2 may be—as in the present embodiment—integrally formed with the carrier 1. The window guide 2 may equally be a separate component for attachment to the carrier 1. The multi function bracket according to the proposal further comprises a motor vehicle lock 5 fastened to the lock receptacle 4.

The multi function bracket according to the proposal is characterized in that a compensation section 6 of the elastic seal 3 is compressed between a counter structure 7 of the multi function bracket and the motor vehicle lock 5 to provide tolerance compensation between the carrier 1 and the motor vehicle lock 5. In other words, the elastic seal 3 is compressed and relaxed in accordance with a relative movement between the motor vehicle lock 5 and the carrier 1 and remains engaged both by the counter structure 7 and the motor vehicle lock 5. Thus, such relative movement is largely noiseless. In particular, the elastic seal 3 is in direct engagement with the motor vehicle lock 5 and in particular a casing of the motor vehicle lock 5.

In principle, and in particular to the extent that the window guide 2 is separate from the carrier 1, the counter structure 7 may equally be comprised by the carrier 1 or by the window guide 2. Consequently, the above tolerance compensation may be in effect directly between the motor vehicle lock 5 and the carrier 1 or indirectly between the motor vehicle lock 5 and the carrier 1 with the window guide 2 being intermediary. It is also to be pointed out that the tolerance compensation between the carrier 1 and the motor vehicle lock 5 need not be exclusively due to the elastic seal 3, which will also be explained in more detail below.

In various embodiments, the lock receptacle 4 comprises a first connecting structure 8a and a second connecting structure 8b for connecting to a first connector 9a and second connector 9b of the motor vehicle lock 5 and in that the compensation section 6 is compressed between the counter structure 7 and the first connector 9a. Advantageously, tolerance compression is therefore provided at one point of—direct or indirect—connection between the carrier 1 and the motor vehicle lock 5.

In principle, the kind of connection between the respective first and second connecting structures 8a, b and the first and second connectors 9a, b may be any kind of mechanical connection. However, the first connecting structure 8a and/or the second connecting structure 8b can be a respective receiving structure 10a, b and in that the first connector 9a and/or second connector 9b is a respective latch 11a, b, wherein the first receiving structure 10a receives the first latch 11a and/or the second receiving structure 10b receives the second latch 11b. Thus, these present plug and socket type connections in which the first and second connecting structures 8a, b are of the socket type and the first and second connectors 9a, b are of the plug type.

Looking at the above first latch 11a in more detail, in various embodiments the first latch 11a comprises a engagement end 12a for engaging behind an opening 13 of the first receiving structure 10a and a clamping section 12b substantially adjacent to the engagement end 12a, wherein the elastic seal 3 is compressed between the counter structure 7 and the clamping section 12b. Such engaging behind is made even easier when—as shown in particular in FIG. 2—the engagement end 12a is a stepped engagement end 12a. Thus, the first latch 11a may pivot around the engagement end 12a for compressing the elastic seal 3 by means of the clamping section 12b. Here the engagement end 12a and the clamping section 12b are substantially planar and also aligned substantially in parallel.

As indicated above, engaging behind the opening 13 of the first receiving structure 10a by the engagement end 12a permits a swiveling of the motor vehicle lock 5 for bringing the second latch 11b into a connecting position for being connected to the second receiving structure 10b. This connecting position of the second latch 11b is thus the position in which the second latch 11b is received by the second receiving structure 10b and corresponds to the position shown in FIG. 1.

In order to ensure reliable compression of the elastic seal 3, when the first connecting structure 8a connects to the first connector 9a, the counter structure 7 and the first connector 9a—here in particular the clamping section 12b—can be arranged at a distance which is less than an uncompressed thickness of the elastic seal 3 for compressing the elastic seal 3 between the counter structure 7 and the first connector 9a. Thus, as long as the first connecting structure 8a is connected to the first connector 9a, the elastic seal 3 remains compressed.

The connection between the second connecting structure 8b and the second connector 9b can also contribute to the compression of the elastic seal 3 by providing an according pre-stress. Here the second connecting structure 8b engages the second connector 9b such that the first connector 9a—in particular the engagement end 12a—is pressed against the first connecting structure 8a by the engagement of the second connecting structure 8b and the second connector 9b.

To increase such a pre-stress, there may be a leverage effect. Accordingly, in some embodiments the first connecting structure 8a and the second connecting structure 8b are respectively offset in the direction of a longitudinal extent 14 of the window guide 2. Because this longitudinal extent 14 generally presents the maximal dimension of the multi function bracket, an offset in this direction permits the use of a large lever arm.

In some embodiments, the second connecting structure 8b comprises a snap-in component 15 for snapping-in the second connector 9b of the motor vehicle lock 5. Here, the snap-in component 15 is a snap-in pin 15a for snapping into a snap-in opening 15b arranged on the second latch 11b.

In some embodiments the elastic seal 3 is formed of one piece. Nonetheless, it is equally possible that it comprises two sections. In particular for this embodiment and as shown in the drawings, the elastic seal 3 consists of an oblong-shaped pane-receiving section 3a and the compensation section 3b, which compensation section 3b is widened with respect to the pane-receiving section 3a. Thus, with regard to the elastic seal's 3 longitudinal axis—which corresponds to the direction of its oblong shape—the compensation section 3b has a greater radial extent than the pane-receiving section 3a.

In order to provide for a more defined compression of the elastic seal 3, according to the embodiment also shown in the drawings, a boss 16 is arranged on the counter structure 7 and/or the clamping section 12b for compressing the elastic seal 3. In the present case, the boss 16 is circular shaped and arranged on the counter structure 7, but could also have a different shape and be equally arranged on the clamping section 12b. Because the effective surface of the boss 16 is smaller than that of the counter structure 7, it determined the way that the elastic seal 3 is compressed more narrowly.

Figure 2:
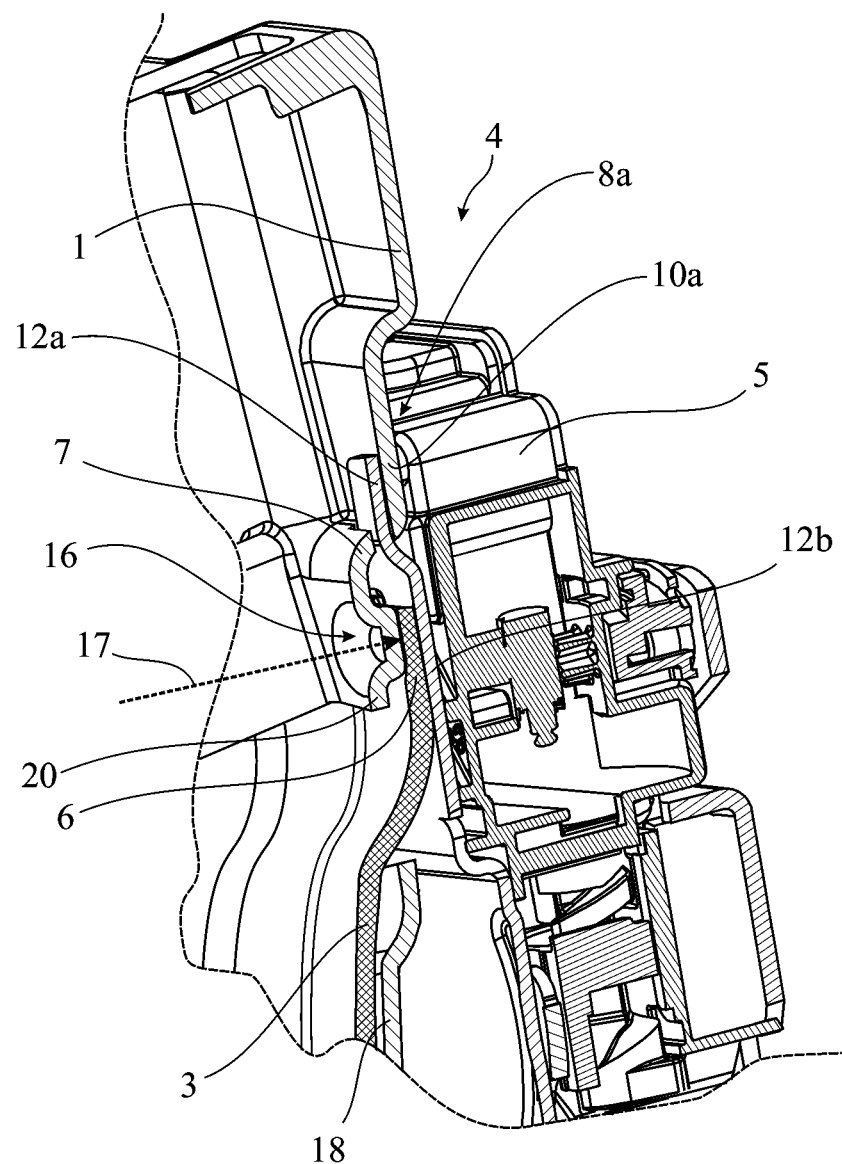
Figure 3:
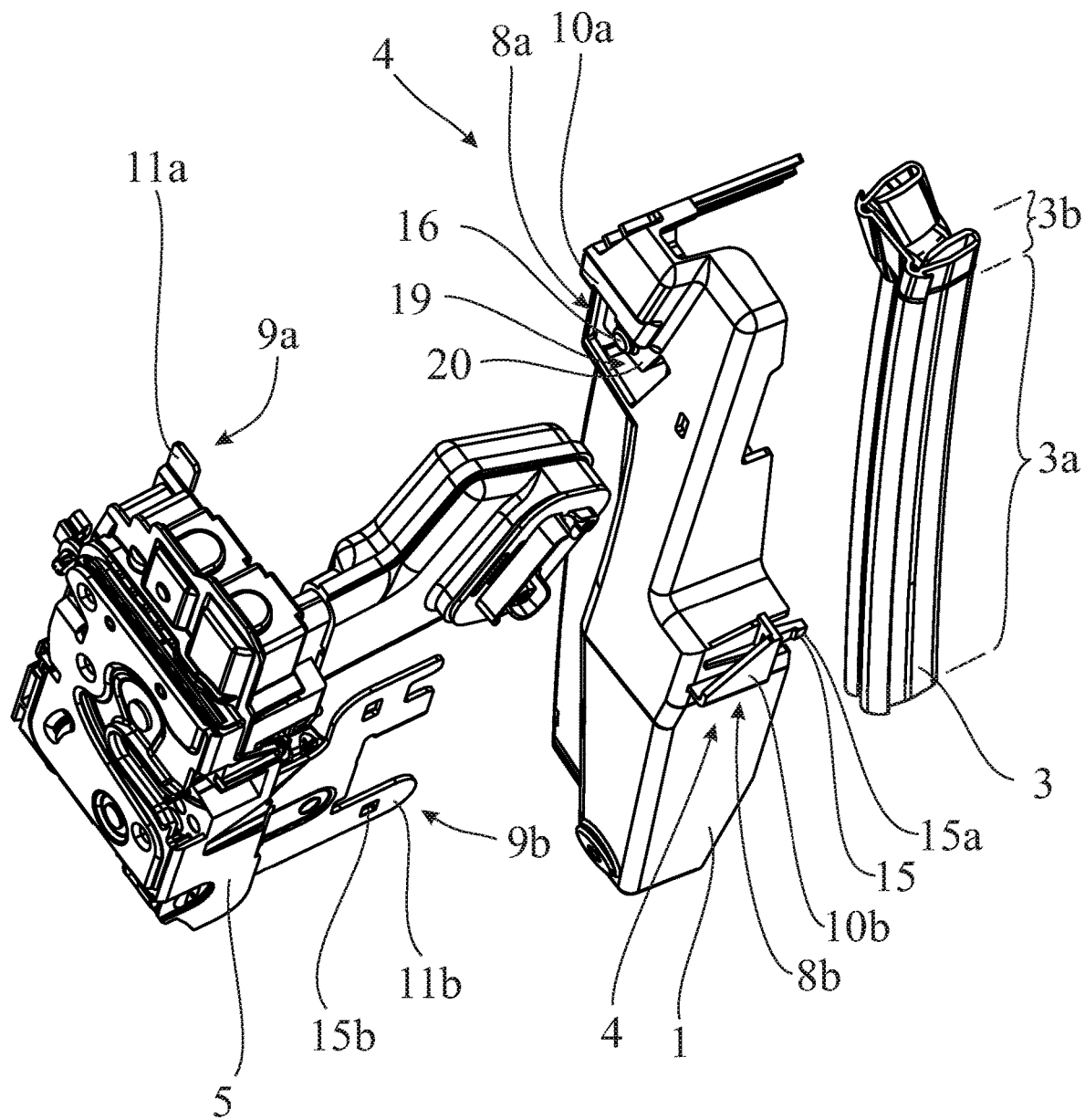

Here, as can be seen from FIG. 2, the boss 16 defines the distance between the clamping section 12b and the counter structure 7. In other words, the boss 16 protrudes from the counter structure 7 in the direction of the first latch 11a and in particular the clamping section 12b.

As indicated above, the counter structure 7 itself may also provide toward effecting tolerance compensation. This can be achieved by having the counter structure 7 at least partially configured to bend elastically. This means that the ability to bend elastically may refer to the entire counter structure 7 or to a substructure of the counter structure 7, as will be explained below. In some embodiments this elastic bending can occur in a direction corresponding to a compression direction 17—which is also indicated in FIG. 2—of the elastic seal 3, so as to contribute to the tolerance compensation between the carrier 1 and the motor vehicle lock 5. The above compression direction 17 and therefore the direction of elastic bending refers to the bending movement as approximated by a linear movement when the motor vehicle lock 5 is fastened to the lock receptacle 4. Since it is a bending movement, the actual and precise movement of the counter structure 7 is more complex, but such a linear approximation is very close in practice.

Considering now in more detail the window guide 2, in the embodiment shown in the drawings the window guide 2 comprises a closed channel section 2a with a bottom wall 18, which bottom wall 18 substantially faces the motor vehicle lock 5. This closed channel section 2a is closed only as it relates to the side facing the motor vehicle lock 5, where the bottom wall 18 is arranged. In other words, the closed channel section 2a may be open with respect to the opposite side, as can be seen from FIG. 1. In various embodiments, the elastic seal 3 rests on a side of the bottom wall 18 opposite to the motor vehicle lock 5, also shown in FIG. 1, and comprises an open channel section 2b with a bottom opening 19 facing the motor vehicle lock 5. In analogy to the closed channel section 2a, also the open channel section 2b is open with respect to the side facing the motor vehicle lock 5, where the above bottom opening 19 is arranged. In various embodiments, the open channel section 2b is an extension of the closed channel section 2a. This means that the open channel section 2b and the closed channel section 2a are aligned collinear and adjacent.

Figure 4:
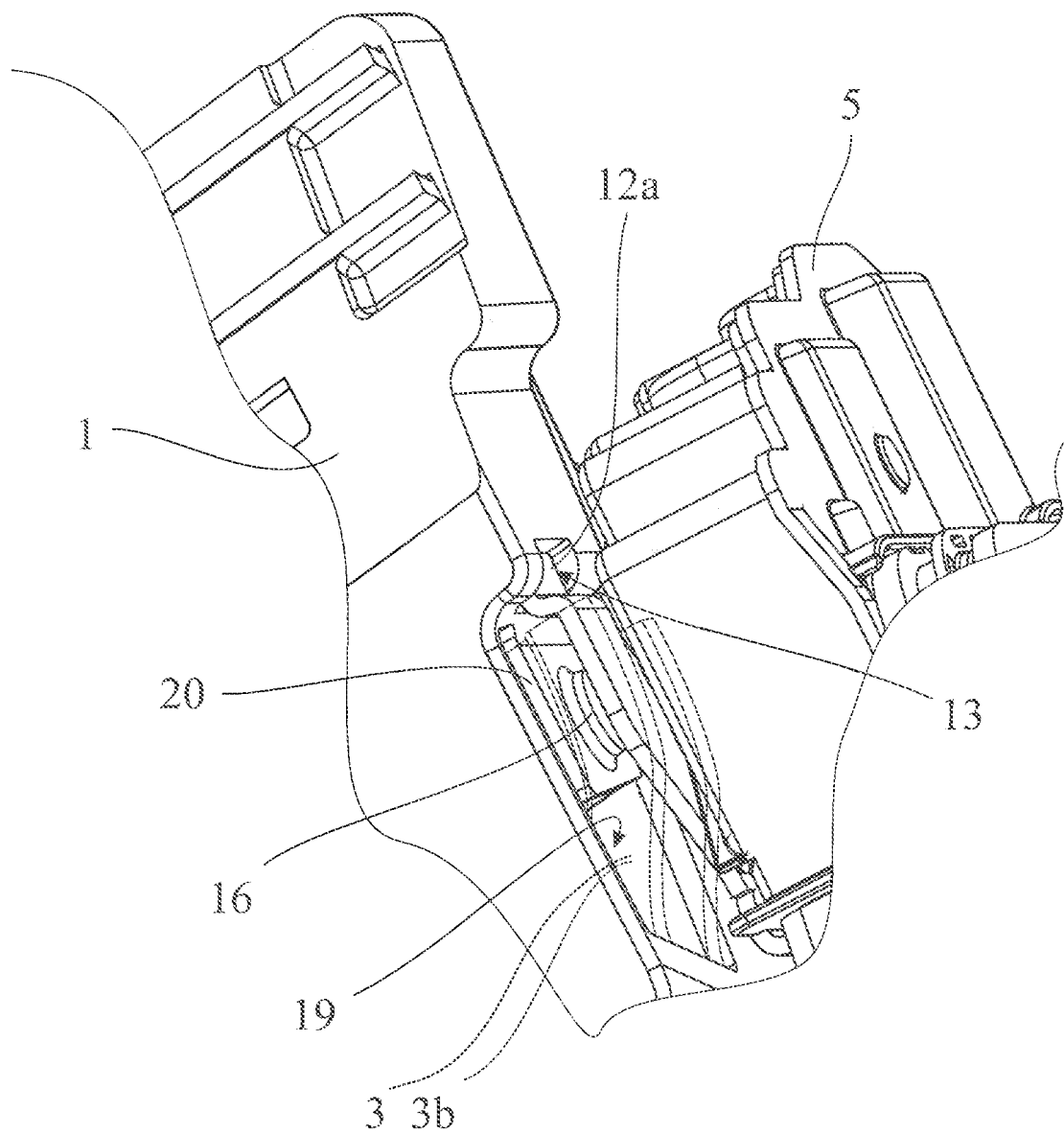
Figure 5:
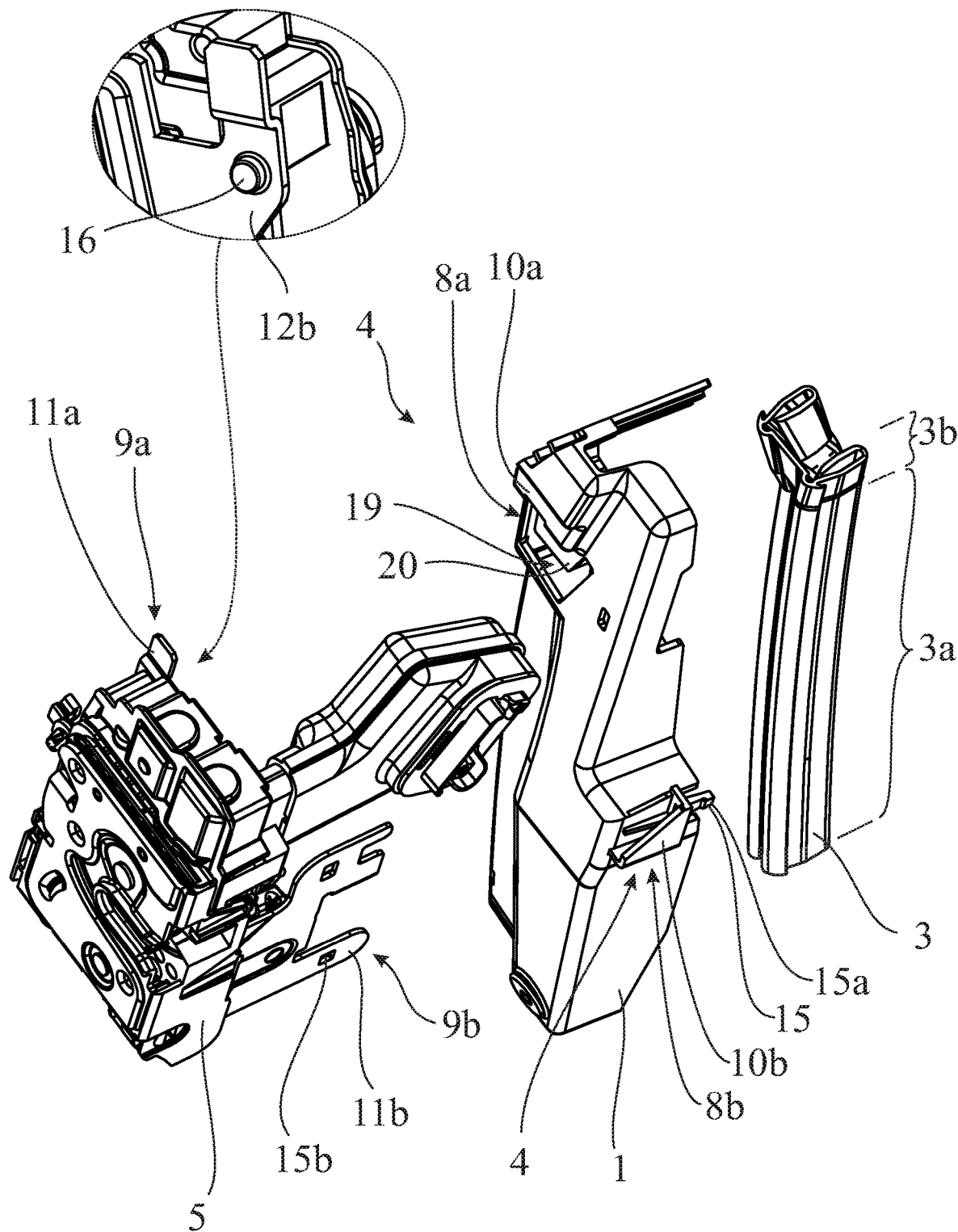

As seen from FIGS. 2 and 4, advantageously the counter structure 7 comprises a ledge plate 20 arranged in the open channel section 2b on which ledge plate 20 the elastic seal 3 rests on a side of the ledge plate 20 toward the motor vehicle lock 5.

This ledge plate 20 may in particular be configured to bend elastically as described above for the counter structure 7. This can be achieved by having the ledge plate 20 is arranged such that the ledge plate 20 protrudes into the open channel section 2b, whereby the ledge plate 20 borders the bottom opening 19 with at least one side. In order to further facilitate bending of the ledge plate 20, the ledge plate 20 can also border the bottom opening 19 with three sides of the ledge plate 20. As can be seen from FIG. 4, this corresponds to the embodiment of the drawings.

Besides enabling more elastic bending of the ledge plate 20, the bottom opening 19 also permits the elastic seal 3 to pass from a far side with respect to the motor vehicle lock 5 to a near side with respect to the motor vehicle lock 5. This can be seen in particular from FIG. 2. Accordingly, the elastic seal can be 3 arranged in the window guide 2 and passes through the bottom opening 19 such that the elastic seal 3 is placed on a far side of the bottom wall 18 with respect to the motor vehicle lock 5 and on a near side of the ledge plate 20 with respect to the motor vehicle lock 5. Thereby the bottom opening 19 serves a dual purpose as well.

The invention claimed is:

1. A multi function bracket for use in a motor vehicle door, the multi function bracket comprising:
   a carrier comprising a lock receptacle, and a counter structure,
   a motor vehicle lock fastened to the lock receptacle,
   a window guide for receiving a window pane, and
   an elastic seal arranged in the window guide for being compressed by the window pane, wherein the elastic seal comprises a compensation section that is compressed between the counter structure and the motor vehicle lock to compensate for tolerances of the carrier and the motor vehicle lock.

2. The multi function bracket according to claim 1, wherein the elastic seal consists of a pane-receiving section and the compensation section, wherein the compensation section is wider than the pane-receiving section.

3. The multi function bracket according to claim 1, wherein the carrier comprises a first connecting structure and a second connecting structure for connecting to a first connector and a second connector of the motor vehicle lock and wherein the compensation section is compressed between the counter structure and the first connector.

4. The multi function bracket according to claim 3, wherein the second connecting structure comprises a snap-in component for snapping-in the second connector of the motor vehicle lock.

5. The multi function bracket according to claim 3, wherein the first connecting structure comprises a first receiving structure, the first connector comprises a first latch, and the first receiving structure receives the first latch, and wherein the second connecting structure comprises a second receiving structure, the second connector comprises a second latch, and the second receiving structure receives the second latch.

6. The multi function bracket according to claim 5, wherein the first latch comprises a stepped engagement end for engaging the first receiving structure and a clamping section substantially adjacent to the engagement end, wherein the compensation section of the elastic seal is compressed between the counter structure and the clamping section.

7. The multi function bracket according to claim 6, wherein the engagement end is substantially planar and the clamping section is substantially planar, and wherein the engagement end and the clamping section are substantially parallel to one another.

8. The multi function bracket according to claim 6, wherein the engagement between the first receiving structure and the engagement end permits a swiveling of the motor vehicle lock relative to the carrier for bringing the second latch into a connecting position for connecting to the second receiving structure.

9. The multi function bracket according to claim 6, wherein a boss is arranged on one of the counter structure and the clamping section for compressing the compensation section of the elastic seal.

10. The multi function bracket according to claim 9, wherein the boss and the compensation section defines the distance between the clamping section and the counter structure.

11. The multi function bracket according to claim 3, wherein when the first connecting structure connects to the first connector, the counter structure and the first connector are arranged at a distance which is less than an uncompressed thickness of the compensation section of the elastic seal.

12. The multi function bracket according to claim 3, wherein the second connecting structure engages the second connector such that the first connector is pressed against the first connecting structure by the engagement of the second connecting structure and the second connector.

13. The multi function bracket according to claim 3, wherein the first connecting structure and the second connecting structure are respectively offset with respect to a longitudinal center line of the carrier.

14. The multi function bracket according to claim 3, wherein the second connecting structure engages the second connector such that an engagement end of the first connector is pressed against the first connecting structure by the engagement of the second connecting structure and the second connector.

15. The multi function bracket according to claim 1, wherein the counter structure is at least partially configured to bend elastically so as to contribute to the tolerance compensation of the carrier and the motor vehicle lock.

16. The multi function bracket according to claim 1, wherein the window guide comprises a closed channel section and an open channel section that is an extension of the closed channel section, wherein the closed channel section has a bottom wall that has a first side that substantially faces the motor vehicle lock and has a second side opposite to the first side on which the elastic seal rests, and wherein the open channel section has an opening facing the motor vehicle lock.

17. The multi function bracket according to claim 16, wherein the counter structure comprises a ledge plate arranged in the open channel section, wherein the compensation section of the elastic seal is disposed on a side of the ledge plate that faces the motor vehicle lock such that the compensation section of the elastic seal is disposed between the ledge plate and the motor vehicle lock.

18. The multi function bracket according to claim 17, wherein the ledge plate is arranged such that the ledge plate protrudes into the open channel section, whereby at least one side of the ledge plate borders the opening of the open channel section.

19. The multi function bracket according to claim 17, wherein the elastic seal is arranged in the window guide and the compensation section passes through the opening such that the elastic seal is placed on the second side of the bottom wall and on the side of the ledge plate that faces the motor vehicle lock.

20. The multi function bracket according to claim 17, wherein the ledge plate is arranged such that the ledge plate protrudes into the open channel section, whereby three sides of the ledge plate border the opening of the open channel section.

* * * * *